Feb. 3, 1925.
1,525,253
H. SCHLAICH
INSTRUMENT CONSTRUCTION
Filed April 28, 1919
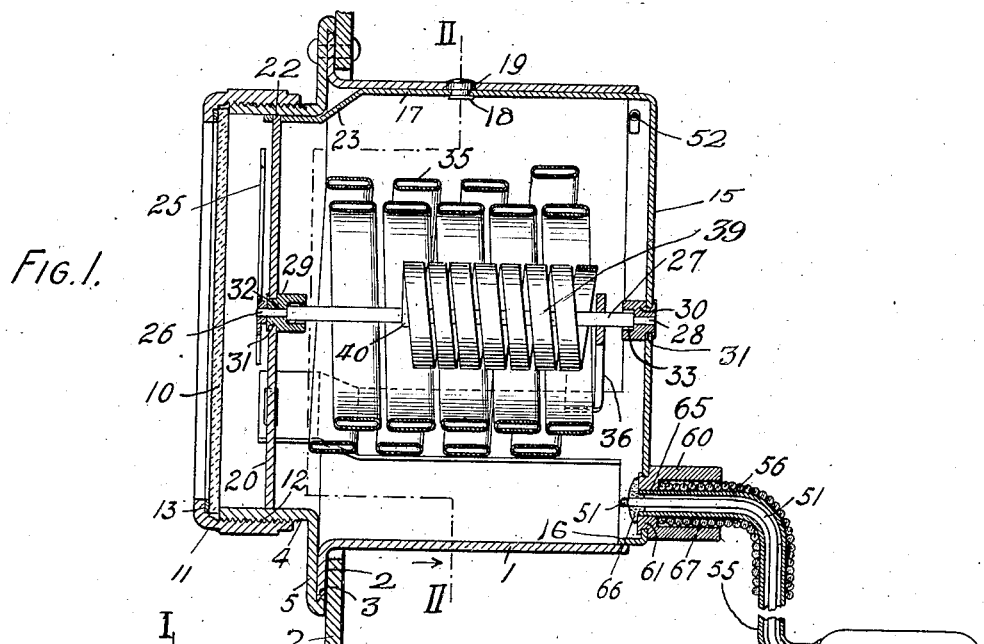
FIG.1.
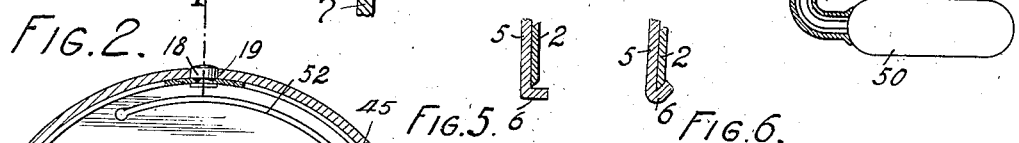
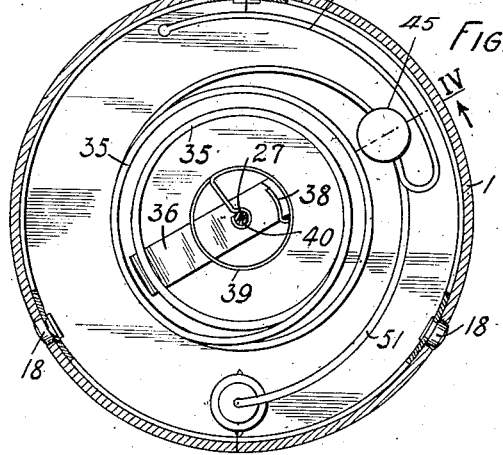
FIG.2.
FIG.5.  FIG.6.
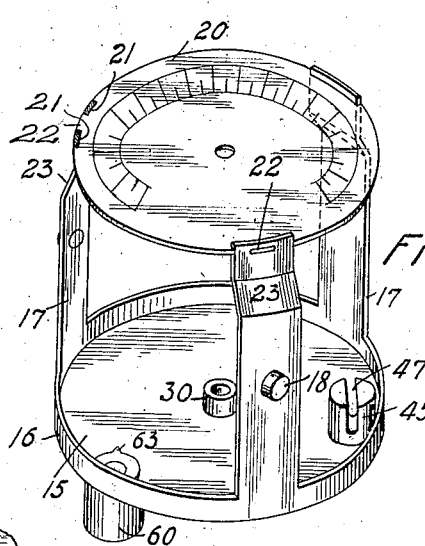
FIG.3.
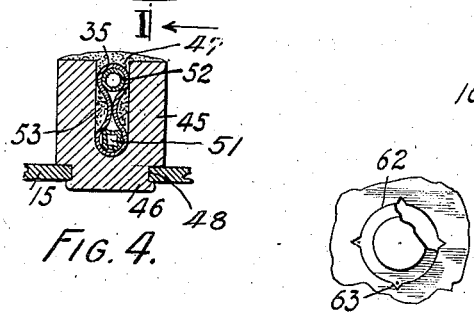
FIG.4.
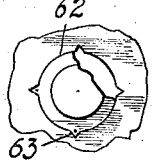
FIG.7.
INVENTOR
Herman Schlaich
BY
Edmund Quincy Moses
HIS ATTORNEY Patented Feb. 3, 1925.

1,525,253

UNITED STATES PATENT OFFICE.

HERMAN SCHLAICH, OF BROOKLYN, NEW YORK.

INSTRUMENT CONSTRUCTION.

Application filed April 28, 1919. Serial No. 293,265.

*To all whom it may concern:*

Be it known that I, HERMAN SCHLAICH, a citizen of Germany (having declared my intention of becoming a citizen of the United States), residing in the borough of Brooklyn, city of New York, county of Kings, State of New York, have invented certain new and useful Improvements in Instrument Constructions, of which the following is a specification.

This invention relates to the construction of instruments, particularly indicating instruments, such as thermometers, gages, clocks and the like, and comprises certain improvements in instrument casings, in bearings for shafts and arbors or other rotatable members used therein and in various details relating especially to the manner of mounting and connecting the tubular members utilized in thermometer or gage constructions of the Bourdon spring type.

Certain types of instruments, such as the temperature indicating instruments utilized for indicating the thermal condition of internal combustion motors or airplanes or other motor vehicles are subjected to severe and continuous vibration which tends to loosen screws and disconnect other fastening means utilized in such instruments and particularly in the casings thereof and it is an important object of the present invention to provide an improved casing construction for an instrument adapted to be used under such severe conditions in which fastening means are employed of such character that they cannot becomed loosened or disconnected by vibration. In the preferred application of my invention I provide an instrument casing in which no screws whatever are utilized in securing the various parts together. Also I provide a construction which is very economical to manufacture, which may be assembled with great ease and which may be readily taken apart whenever it is desired to inspect or repair the operative parts of the instrument. At the same time the parts are secured together in such a firm and substantial manner as to be immune from the effects of vibration. While this form of casing finds especial utility in instruments subjected to severe vibration it is obviously also of value in connection with instruments used in any manner, because of its simple construction and the ease with which it may be assembled and disassembled.

Another object of the invention is to provide an improved bearing construction also especially applicable to instruments subjected to severe vibration but capable of use in various forms of instruments. Additional objects of the invention will appear in connection with the description of one specific embodiment of my invention which I have chosen to illustrate the principle thereof.

In the accompanying drawings,

Figure 1 is a sectional view taken on line I—I of Figure 2 illustrating my improvements as embodied in a "distance type" thermometer of the character employed for indicating the thermal condition of aeroplane or other engines.

Figure 2 is a transverse sectional view of the instrument shown in Figure 1 taken on line II—II of Figure 1.

Figure 3 is a perspective view of the casing back, dial supporting arms and dial.

Figure 4 is a detail sectional view on an enlarged scale of the supporting post for the Bourdon spring, taken on line IV of Figure 2.

Figures 5 and 6 are detail sectional views showing intermediate steps in the process of connecting the front and rear portions of the outer casing.

Figure 7 is a detail plan view of a portion of the back-plate of the instrument casing showing the attachment of the leading-in sleeve thereto.

Referring to the drawings in detail and first to the casing construction illustrated, the casing comprises a rear outer shell member 1, preferably of cylindrical form and having its front edge turned outwardly to form a flange 2 which is preferably provided with a beveled edge as shown at 3. A front casing member 4 is provided which has an outwardly turned flange 5 adapted to rest against the flange 2 and to be secured thereto by having a lip 6 bent over at the periphery of the flange, so as to engage beneath the beveled edge 3 of the flange 2. In the manufacture of this construction, the lip 6 is preferably formed at right angles to the flange, as shown in Figure 5, and the flange 2 then brought against the flange 5 after which the lip 6 is bent or spun over the beveled edge 3 as shown in Figure 6. The projecting portion of the lip 6 is then faced off flush with the under surface of the flange 2 thereby providing a smooth faced collar or rim projecting outwardly from the casing and adapted to be seated upon and attached to the instrument board 7 or other support. The front of the instrument is preferably closed by a cover glass 10 which may be secured in position in any suitable manner as by means of a bezel 11 screwing on a screw threaded portion 12 of the casing member 4, a washer or packing 13 of paraffined paper or other suitable composition being inserted between the bezel and glass. The back of the instrument casing which also preferably constitutes a base for supporting the working parts thereof, comprises a plate 15, which is preferably formed with an integral flange 16 adapted to fit within the rear edge of the casing member 1. A plurality of spring arms 17 are also provided, (three in the particular construction illustrated), these arms being preferably formed integral with the back plate and its flange and being arranged to fit snugly within the casing member 1. These arms and the casing member are suitably formed to interlock so as to hold the back-plate and casing member together. The construction shown for this purpose comprises a stud 18 on each of the arms adapted to be received in a corresponding hole 19 formed in the casing wall. Owing to the resiliency of the arms 17 they may be sprung inwardly sufficiently to permit the studs to pass inside of the casing wall until the holes 19 are reached when the studs snap into the holes and so lock the back plate and casing together.

The arms 17 in addition to securing the back-plate and casing member together are also preferably employed to carry the front plate or dial of the instrument. Such a dial plate is shown in the drawings at 20 and comprises a metal disc notched as indicated at 21 to receive the upper ends of the arms 17. Projecting from the bottom of each notch is a tongue portion 22, adapted to project through a slot near the outer end of each of the arms. Before the arms are inserted within the casing member 1, they are sprung apart sufficiently to permit the tongues 22 to be engaged within the corresponding slots after which the dial and arms are introduced into the casing member and the studs 18 engaged within the holes 19. When this has been accomplished it will be seen that the parts of the instrument casing including the dial are fully assembled and securely locked together without the use of screws or other removable fastening devices.

The dial plate acts as a support for the outer ends of the arms and holds them firmly in engagement with the inner walls of the casing member. At the same time the engagement of the arms with the latter prevents them from separating, and so retains the arms in positive engagement with the dial plate.

To remove the back-plate and dial from the casing members it is merely necessary to force in the studs 18 sufficiently to permit them to clear the walls of the holes 19 in the casing member when the parts may be readily drawn apart. A suitable tool adapted to apply pressure to the three studs 18 simultaneously may be provided for this purpose if desired.

In a construction such as that illustrated in which the front casing member 4 is of smaller diameter than the rear casing member 1 and in which the dial plate fits within the front casing member, the arms are inwardly offset near the extremities as indicated at 23.

The works of the instrument are located between the back-plate and the dial plate, and are preferably arranged so as to be chiefly carried by the back-plate 15. In the thermometer or gage construction illustrated, an index hand is provided which is adapted to be moved over the front of the dial plate and to be visible through the glass crystal of the instrument. This indicating hand is shown at 25 in Figure 1 and is fixed to the outer end of the journal 26 projecting from the arbor 27 mounted within the instrument. The arbor 27 has a second journal 28 projecting from its opposite end, both of these journals being of smaller diameter than the arbor itself. The bearings 29 and 30 for these journals are preferably mounted respectively upon the dial plate 20 and the back plate 15, and may be secured in position in any suitable manner but preferably they are each formed with a neck 31 of reduced diameter adapted to be received within a hole in the plate carrying the same, the outer end of the neck being riveted over slightly. Each of the bearings has a bore 32 of a diameter to form a close, but not tight fit with the corresponding journal portion of the arbor, so that these journals will turn freely in such bores with as little friction as possible. By making the journals and bores of small diameter the frictional resistance is greatly reduced. Owing to the small diameter of the journals, however, great strength is not attainable and there may also be such wear as to cause the journal to eventually break off. In order that the arbor may still be supported in position, however, and not permitted to fall out of place so as to prevent the operation of the instrument and to cause possible injury to other parts of the delicate mechanism thereof, I preferably form in the bearings the additional bores 33 of sufficient diameter to receive without touching the end portions of the main body of the arbor 27. That is to say, a slight clearance is left between the ends of the arbor and the walls of bores 33 as shown in Figure 1. In practice, in an instrument such as that illustrated I make this clearance about .005". Normally the arbor is supported in position only by the engagement of the journals 26 and 28 in the bores 32 in the bearings, thus securing the advantage of the very small frictional resistance resulting from the small diameter of the journals, but in case of the breakage of a journal, then the end of the arbor will be supported by its engagement with the walls of the bore 33, so that the arbor is still sustained in its proper position.

The arbor 27 may be readily assembled within its bearings at the time that the dial plate is introduced between the ends of the arms 17, the locking of the dial plate in position as above explained also retaining the arbor in its bearings.

The working parts of the instrument illustrated, are of the same character and operate in the same manner as that described in my application for United States patent, Serial No. 218,801, filed February 23, 1918. The main operative element comprises a Bourdon spring or flattened tube 35 coiled into a double helical coil and supported at one end by a suitable support attached to the back plate. The free end of the Bourdon spring or tube is connected to the end of the longer arm of a lever member 36 mounted to rotate freely on the arbor 27 and having its short arm connected at 38 to the rear end of a bimetallic compensating coil 39, the forward end of which is fastened to the arbor at the point 40. The support for the fixed end of the Bourdon coil preferably comprises a block or stud 45 secured to the back-plate 15 in any suitable manner, as by having a neck 46 fitting a hole in said back plate and riveted over, this stud being bifurcated as indicated at 47 so as to receive the end of the flattened Bourdon tube or coil 35. Preferably the hole 48 which receives the neck 46 is notched out so as to give it a form similar to that of the hole 62 shown in Figure 7 so that when the neck is riveted over the metal will engage with the edge of the notches and hold the stud firmly against turning.

In the case of an instrument such as a distance type thermometer where indications are to be given of changes in temperature occurring at a distant point, a bulb 50 is provided which is to be located at the distant point and which is connected to the Bourdon coil by a tube 51, the coil, tube and bulb being preferably filled with an expansible liquid such as alcohol, glycerine or mercury. The tube 51 is preferably of very small bore and as illustrated is of the star shaped configuration described in my application for patent above referred to and is preferably connected with the end of the Bourdon tube by being inserted a little way within the latter and secured by solder. For the purpose of introducing the expansible liquid into the system a short section of small tube 52 is preferably employed, the end of which is also introduced into the end of the flattened Bourdon tube. The latter is preferably opened up at two points into a sort of figure 8 shape as shown in Figure 4, the ends of the tubes 51 and 52 being introduced into the opened up portions of the Bourdon tube and being sealed therein by solder which is also filled into the notch 47 of the block 45 as indicated at 53 so as to hold the tubes securely in the notch. This construction is one which may be very readily assembled and in which the parts are firmly secured together without danger of leakage. When the tubes and bulb have been properly filled with liquid through the tube 52 the end of the latter is sealed by welding or soldering.

The tube 51 is preferably enclosed throughout that portion of its length exterior to the instrument casing by a jacket tube 55, as described in my aforesaid application for patent, this jacket tube tending to prevent injury to the capillary tube 51 and also insulating the capillary tube to a certain extent against the effects of external temperature changes. Further protection against breakage of the capillary tube may also be provided in the form of a flexible tubular armour 56 which may be extended to enclose a part or all of the tube 55. The capillary tube is preferably introduced into the casing through a sleeve 60 attached to the back-plate of the casing, this sleeve 60 being conveniently mounted by having a reduced neck portion 61 projecting through a hole 62 in the back-plate. This hole is preferably formed with the notched corners 63 so as to give it a generally rectangular form as is shown in Figure 7, portions of the neck 61 being riveted over into the notches 63. The sleeve 60 is thus secured to the plate and at the same time positively held against rotation with relation thereto. The sleeve has an opening through the inner end thereof indicated at 65, of such diameter that the end of the casing tube 55 will fit the same closely, the latter being preferably flanged over the end of the sleeve inside of the casing and secured by solder as indicated at 66. The capillary tube is continued over to the block 45 as already described. The casing 60 is preferably provided with a bore 67 of sufficient diameter to receive the end of the tubular armour 56 which may be secured in such bore by solder. The construction described provides a simple and readily assembled, and at the same time firm mounting for the ends of the casing tube and tubular armour which is particularly important in an instrument subjected to severe vibration as it effectually prevents breakage of the capillary tube where it enters the casing, this being one of the most frequent causes of trouble in an instrument of this character unless proper precautions are taken to avoid the difficulty.

While I have illustrated and described one construction of instrument embodying the various features of my invention in preferred form, it will be understood that I do not intend to limit myself to the specific embodiment shown but that I intend by the appended claims to cover my invention broadly in whatever form its principle may be employed. It will also be understod that all of the different novel features described need not be employed in a single construction but that such features may be utilized individually where desirable.

Having thus described my invention, I claim:

1. In instrument construction the combination of a casing comprising a shell, a back plate for the casing having arms extending forwardly within the casing shell, a dial plate carried by said arms, bearings on said dial plate and back plate, and an arbor journaled in said bearings, said dial plate, casing and arms being so constructed that the dial plate is removable from said arms when the back plate is removed from the casing but is locked in engagement with said arms when the casing shell and back plate are in assembled relation.

2. In instrument construction the combination of a casing comprising a shell, a sheet metal back plate having forwardly bent arms, a dial carried by said arms, a rotatable arbor supported by said dial and back plate, and a helically coiled Bourdon tube supported at one end upon said back plate and having its other end operatively connected with said arbor.

3. In instrument construction the combination of a casing shell, a back plate, a front plate, means for connecting said plates to one another, said means comprising tongues projecting outwardly from recesses in the edge of one of the plates, and resilient arms integral with the other plate and having recesses for receiving said tongue, said arms being pressed against said plate by engagement of the casing shell therewith.

4. In instrument construction the combination of a casing shell, a sheet metal back plate having integral arms extending forwardly within the casing shell, said arms being resilient and in frictional engagement with the wall of the casing shell, a dial plate carried by said arms, bearings carried by said dial plate and back plate, and an arbor carried in said bearings.

5. In instrument construction the combination of a casing comprising a shell, a back plate, and a front plate, said back plate having forwardly projecting spring arms engaging with and supporting said front plate, said arms being pressed into engagement with said front plate by the casing shell when the front plate, arms and back plate are assembled with the casing.

6. In instrument construction the combination of a casing shell, a back plate, a front plate, one of said plates being provided with spring arms engaging with and supporting the second plate, said arms being in firm engagement with the wall of the casing shell and being pressed inwardly thereby into firm engagement with said plate.

7. In instrument construction the combination of a casing comprising a shell, a back plate, and a front plate, one of said plates being provided with spring arms adapted to engage and support the second plate, said engagement being maintained by pressure of the casing shell against the arms when the plates and arms are assembled with the casing shell.

8. In instrument construction the combination of a casing comprising a shell, a front plate, and a back plate, one of said plates being provided with arms adapted to fit within the casing shell and having means at their ends for engaging and supporting the other plate, said means being held in engagement with said plate when the parts are assembled, by the engagement of the casing shell walls with said arms.

9. In instrument construction the combination of a casing comprising a shell, a back plate having integral forwardly projecting arms provided with slots near their ends, said arms being adapted to fit closely within the casing shell, and a front plate carried by said arms and having portions adapted to project into said slots, said arms being held in engagement with said front plate by the engagement of the casing shell walls therewith when the parts are assembled.

10. In instrument construction the combination of a casing comprising a shell, a back plate having mounted thereon the operative parts of the instrument, and a snap connection for connecting said back plate to said casing shell.

11. In instrument construction the combination of a casing shell and a back plate therefor having a yielding spring portion fitting within the casing shell, said casing shell and yielding portion having interlocking parts adapted to snap into locking engagement when the back plate is brought into assembled relation with the casing shell.

12. In instrument construction the combination of a side wall member and a back member having portions adapted to telescope one within the other, one of said telescopic members being formed with a recess and the other being formed with a projection adapted to snap into said recess when the members are telescoped so as to lock said members together.

13. In instrument construction the combination of a cylindrical casing member having spaced holes therein and a back plate member having yielding arms adapted to fit within said cylindrical casing portion, said arms having projections adapted to snap into said holes so as to hold said casing member and back plate member together.

14. In instrument construction the combination of a cylindrical casing member having spaced holes therein and a back plate member having yielding arms adapted to fit within said cylindrical casing portion, said arms having projections adapted to snap into said holes so as to hold said casing member and back plate member together, and a front plate carried by said arms.

15. In instrument construction the combination of a cylindrical casing member having spaced holes therein, a back plate member having yielding arms adapted to fit within said cylindrical casing portion, said arms having projections adapted to snap into said holes so as to hold said casing member and back plate member together, a front plate carried by said arms, an arbor journalled in bearings in said back and front plates, and a helically coiled Bourdon tube mounted between said back and front plates and operatively connected with said arbor.

16. In instrument construction the combination of a casing comprising a back plate, a front plate, a helically coiled Bourdon tube mounted between said back and front plates and supported at one end by said back plate, an arbor to which the free end of said Bourdon tube is operatively connected, said arbor having a journal portion of reduced diameter at each end thereof, and bearings for said arbor in said back and front plates respectively, each of said bearings having a bore of small diameter adapted to receive the corresponding journal portion of said arbor and a bore of larger diameter adapted to receive the adjacent end portion of the arbor, said last mentioned bore being of sufficient diameter to provide a clearance between its inner surface and the adjacent surface of the arbor.

17. In instrument construction the combination of an arbor having a journal portion of reduced diameter, and a bearing for said arbor having a bore of small diameter adapted to fit said journal portion and a bore of larger diameter adapted to receive the adjacent end portion of the arbor, but sufficiently larger than the diameter of the latter so that the end portion of the arbor shall normally be out of frictional contact with the walls of said second bore.

18. In instrument construction, a casing member comprising two concentric cylindrical portions provided with adjacent outwardly turned flanges interlocked together so as to unite said casing portions and provide an outwardly extending attaching flange between the ends of the instrument casing for attaching said casing to an instrument board or the like.

19. In instrument construction, a casing member comprising two concentric cylindrical portions provided with adjacent outwardly turned flanges, one of said flanges having a beveled edge and the edge of the other flange being turned over and interlocked beneath said beveled edge and faced off flush with the surface of said second flange so as to provide a flat faced attaching flange for the instrument.

20. In instrument construction the combination of a casing provided with a back plate having an irregular hole therein, a notched stud having a reduced neck portion fitting said hole and having its outer end riveted over to secure said stud to said back plate, and a Bourdon spring within said casing having one end secured within the notch in said stud.

21. In instrument construction the combination of a casing back having a round hole therein notched out at intervals, a notched stud having a neck portion of reduced diameter fitting said hole and riveted over so as to have portions of the metal forced into the notches of the hole in the back plate and thereby secure the stud rigidly to the back plate and hold the same against rotation with relation thereto, and a Bourdon coil having one end secured within the notch in said stud.

22. In instrument construction the combination of a supporting plate having a round hole therein notched out at intervals, and a member having a cylindrical neck portion fitting said hole and having the metal thereof upset adjacent to said notched out portions so as to attach said member to said supporting plate and prevent rotation of said member with respect to said plate.

23. In instrument construction the combination of a notched support, a Bourdon spring having one end fitting in the notch in said support, said end being opened out in section so as to provide enlargements at top and bottom, and capillary tubes fitted into said enlargements.

24. In instrument construction the combination of a notched support, a Bourdon spring having one end fitted in the notch in said support and opened out in cross section so as to provide spaced enlargements, and capillary tubes fitted in said enlargements, the end of said Bourdon coil being secured within the notched support and the ends of said capillary tubes being sealed within the ends of said Bourdon spring by a filling of solder in the notch of said support surrounding and embedding the end of said Bourdon spring and the adjacent portions of the capillary tubes.

25. In instrument construction the combination of a Bourdon spring closed at one end and having two capillary tubes entering and sealed to the other end thereof, one of said capillary tubes being connected at its opposite end to a bulb and the other of said capillary tubes constituting a filling tube for introducing a liquid into said Bourdon spring, the first capillary tube and said bulb.

26. In instrument construction the combination of a casing, a pressure-responsive element thereon, a capillary tube connected with said pressure-responsive element and extending out of said casing, a casing tube for the part of said capillary tube outside of said instrument casing, and a leading-in sleeve having a neck portion fitting an opening in the instrument casing wall and riveted to said wall, said leading-in sleeve having a hole therethrough adapted to receive the end of said casing tube.

27. In instrument construction the combination of a casing having a pressure-responsive element therein, a capillary tube leading into said casing and connected to said pressure-responsive element, said capillary tube being protected exteriorly of said casing by a casing tube and a flexible tubular armour, and a leading-in sleeve mounted on the casing and having a hole therethrough of a diameter to receive and fit the end of the casing tube, and having an enlarged bore in the outer part thereof adapted to receive the end of the tubular armour.

28. In instrument construction the combination of a casing having a round hole therein notched out at intervals, a pressure-responsive element in the casing, a capillary tube extending from the outside of said casing through the hole therein into the interior of the casing and communicating with said pressure-responsive element, and a leading-in sleeve having a cylindrical neck portion fitting in said hole and having the metal thereof upset into the notches of said hole so as to secure said sleeve to the casing wall.

HERMAN SCHLAICH.